United States Patent [19]

Owens et al.

[11] Patent Number: 5,896,415
[45] Date of Patent: Apr. 20, 1999

[54] DEVICE FOR OUT-OF-BAND TRANSMISSION ON COMPUTER PERIPHERAL

[75] Inventors: Craig Owens, Belmont; John Griesing, Saratoga, both of Calif.

[73] Assignee: 3 Com Corporation, Santa Clara, Calif.

[21] Appl. No.: 08/863,507

[22] Filed: May 27, 1997

[51] Int. Cl.$^6$ ................................................. G06F 11/00
[52] U.S. Cl. ..................... 375/224; 375/222; 375/257; 375/377; 395/183.06; 395/183.19; 379/27
[58] Field of Search ........................ 375/222, 356, 375/257, 377, 224; 364/240; 379/93.29, 93.28, 29, 27; 395/183.01, 183.12, 183.03, 183.06, 183.19; 371/20.5

[56] References Cited

U.S. PATENT DOCUMENTS

| | | | |
|---|---|---|---|
| 5,249,183 | 9/1993 | Wong et al. | 370/85.3 |
| 5,249,218 | 9/1993 | Sainton | 379/93.29 |
| 5,473,552 | 12/1995 | Chen et al. | 375/222 |
| 5,655,009 | 8/1997 | Arai et al. | 379/93.28 |
| 5,768,495 | 6/1998 | Campbell et al. | 395/183.01 |

*Primary Examiner*—Amanda Le
*Attorney, Agent, or Firm*—Wilson Sonsini, Goodrich & Rosati

[57] ABSTRACT

A peripheral device for use with a computer. The peripheral device includes a data path, a control circuit coupled to the data path for controlling data communication and a port. The port includes a connector used by the data path. The connector includes a first set of pins that are used by the data path and a second set of pins that are not used by the data path. The first set of pins are coupled to the data path for data communication from the data path to the computer, and the second set of pins coupled to the control circuit for providing access to the control circuit from the port.

14 Claims, 5 Drawing Sheets

DEVICE FOR OUT-OF-BAND TRANSMISSION ON COMPUTER PERIPHERAL

BACKGROUND OF THE INVENTION

1. Field of the Invention

The present invention relates to ports on peripheral devices; and more particularly to ports for out of band communication.

2. Description of Related Art

Configuration and maintenance of electronic computer peripheral equipment is critical. When a user has purchased a peripheral device, the device may need to be set-up. Later, during the use of the device, the device may require trouble shooting, debugging, or diagnosis. Standard interfaces provided on devices may not provide sufficient access to circuitry within the devices to allow for performance of diagnosis, assessment of status, or debugging. However, physically opening the device in order to gain access to the circuitry in the device may be time consuming, inconvenient, or destructive to the device.

What is needed is a port in a computer peripheral device which allows access to control circuitry in the device, without requiring that the device be disassembled. In some prior computer peripherals devices, a port was provided for diagnostic purposes. Such an extra port requires additional hardware and space on the device. Further, such an additional port may be confusing to a user, who may not be aware of the purpose of the port. What is needed, therefore, is an improved interface for access to internal circuitry in a computer peripheral device for a diagnostic or other purposes.

SUMMARY OF THE INVENTION

The present invention provides out of band transmission over a standard port on a peripheral device. Compliance is maintained with the standard, thus allowing the port to be used for communication under the standard for applications such as high speed data transmission. The same port is used for out-of-band transmission. The out-of-band transmission provides access to control or other circuitry on the peripheral device and can be used for diagnosis, assessment of status, debugging, or other purposes. In one embodiment of the invention, the standard port has unused ports and those pins are used for out-of-band transmission.

One embodiment of the invention includes a peripheral device for use with a computer. The peripheral device includes a data path, a control circuit coupled to the data path for controlling data communication and a port. The port includes a connector used by the data path. The connector includes a first set of pins that are used by the data path and a second set of pins that are not used by the data path. The first set of pins are coupled to the data path for data communication from the data path to the computer, and the second set of pins coupled to the control circuit for providing access to the control circuit from the port.

In an embodiment of the invention includes a peripheral device in which the connector comprises an RJ-45 connector. An embodiment of includes circuitry that provides serial communication between the second set of pins and the control circuit, the circuitry coupled to the second set of pins and the control circuit. In an embodiment of the invention, the port comprises a set of isolators coupled to the second set of pins and the control circuitry. In some embodiments of the invention the isolators are opto-couplers.

In an embodiment of the invention the first set of pins comprises pins used normally by a 10BASE-T Ethernet protocol and the second set of pins comprises pins not used normally by the 10BASE-T Ethernet protocol.

Embodiments of the invention include a cable modem. Other embodiments of the invention comprise a system including a device for troubleshooting, and a diagnostic cable coupled to the device for troubleshooting.

An embodiment of the invention comprises a port having a set of isolators and an RJ-45 connector. The connector includes a first set of pins and a second set of pins. The first set of pins includes four pins for providing data communication between the first device and the second device. The second set of pins includes four pins for providing out-of-band communication with the third device. The second set of pins is coupled to the isolators to isolate the second set of pins from circuitry in the first device.

Other aspects and advantages to the present invention can be seen upon review of the figures, the detailed description, and the claims which follow.

DETAILED DESCRIPTION

Figure 1A:
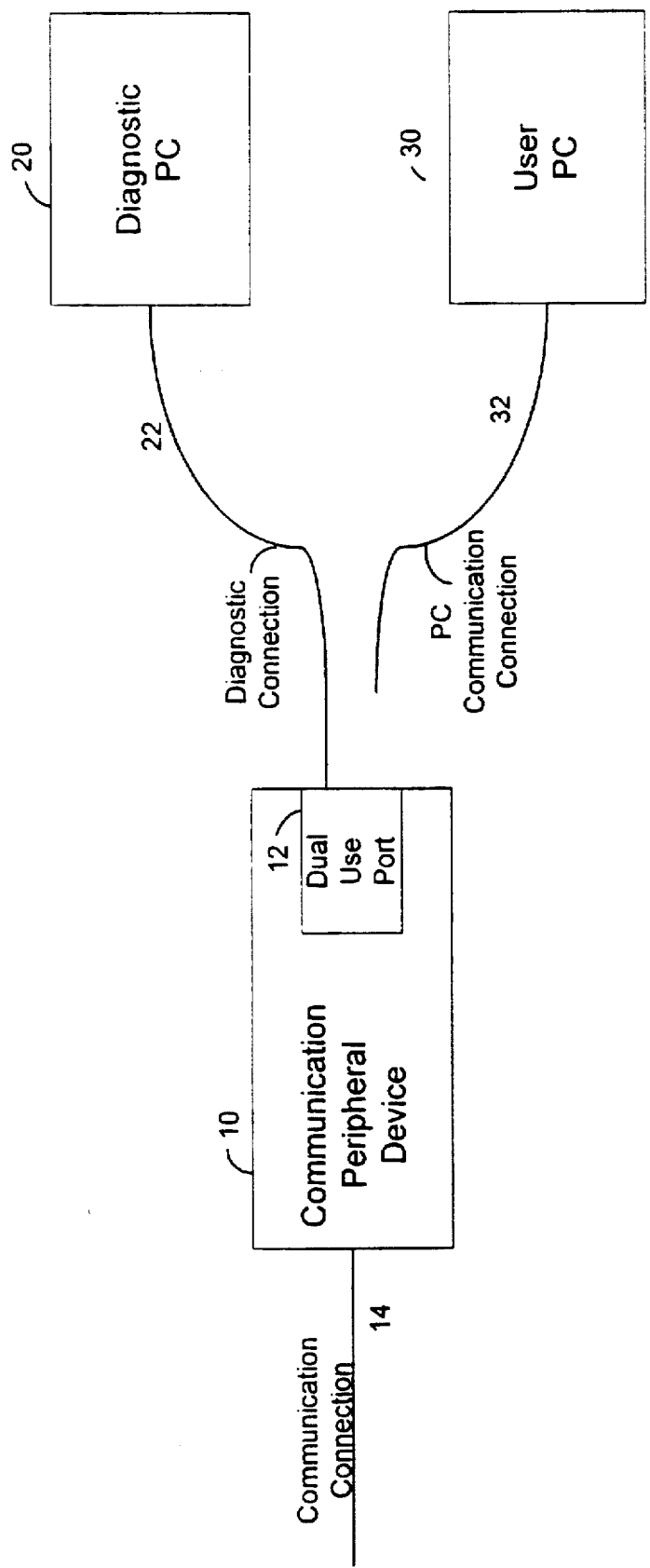
FIG. 1A is a block diagram of a system with a communication peripheral device including a dual use port.

A dual use port is provided on a peripheral device. The dual use port provides access to the data path in compliance with a standard. Additionally, the dual use port provides out-of-band communications over the standard connector. Using the out-of-band communications, access is provided to a control circuit within the communications peripheral. A first set of pins in the dual use port is normally used by a data path of the communications peripheral device. The first set of pins is coupled to the data path for data communication from the data path to a computer. A second set of pins that are not normally used by the data path are used for out-of-band communications to provide access to the control circuit from the port. An embodiment of the invention also includes a cable modem for a computer where the cable modem includes a dual use port. A first set of pins is coupled to a data path in the cable modem. A second set of pins is coupled to a control circuit in the cable modem for providing out-of-band communication into the cable modem.

FIG. 1 is a block diagram of a system with a communication peripheral device including a dual use port. FIG. 1 A includes a communication peripheral device 10, diagnostic PC 20, diagnostic connection 22, user PC 30, PC communication connection 32, and communication connection 14. Communication peripheral device 10 includes a dual use port 12. Communication connection 14 is coupled to peripheral device 10. Diagnostic connection 22 connects diagnostic PC 20 to dual use port 12. PC communication connection 32 connects user PC 30 to communication peripheral device via dual use port 12.

Communication peripheral device 10 provides communication capability to user PC 30 through a connection to some form of communication medium over communication connection 14. Such a communication medium may be a cable as in a cable television system which allows for computer connections, or a connection to a twisted pair telephone wire set, or a connection to a fiber optic system or other system or source of data transmission or reception. Communication peripheral device 10 may be any peripheral device which may be connected to a computer. Communication peripheral device could include but is not limited to a modem, such as a cable modem or a telephone modem, or a peripheral device such as a printer, scanner, display device, other input or output device, sensor, other data acquisition or transmission device or control device. User PC 30 may be connected via PC communication connection 32 to communication peripheral device 10 via dual use port 12. User PC 30 can transmit and receive data to communication peripheral device 10 using PC communication connection 32.

FIG. 1A shows diagnostic connection 22 coupled to dual use port 12. However, PC communication connection 32 may alternatively be connected to dual use port 12 to provide communications for user PC 30 to communication peripheral device 10. Diagnostic PC 20 can obtain access to communication peripheral device 10 through the same port, dual use port 12, that has been used for connection of user PC 30 to communication peripheral device 10.

Out-of-band communication is provided through dual use port 12. In-band communication is any communication that would normally be performed over a standard port. In-band communication may include communication that normally takes place between a user PC and a peripheral device. Such communication for example, may be data communication from a modem to a PC for purposes, such as viewing web pages via a web browser, other internet communications, or signals to a printer or other peripheral. In addition to in-band communication, out-of-band communication is possible via dual use port 12. Out-of-band communication is communication for purpose other than or in addition to in-band communication. For example, out-of-band communication may include but would not be limited to use of a terminal program to determine the status of communication peripheral device 10. Out of band communication can also include other diagnostic or trouble shooting access to communication peripheral device 10 from diagnostic PC 20. Also out-of-band communication could include set up, configuration, other control of communication peripheral device 10.

Figure 1B:
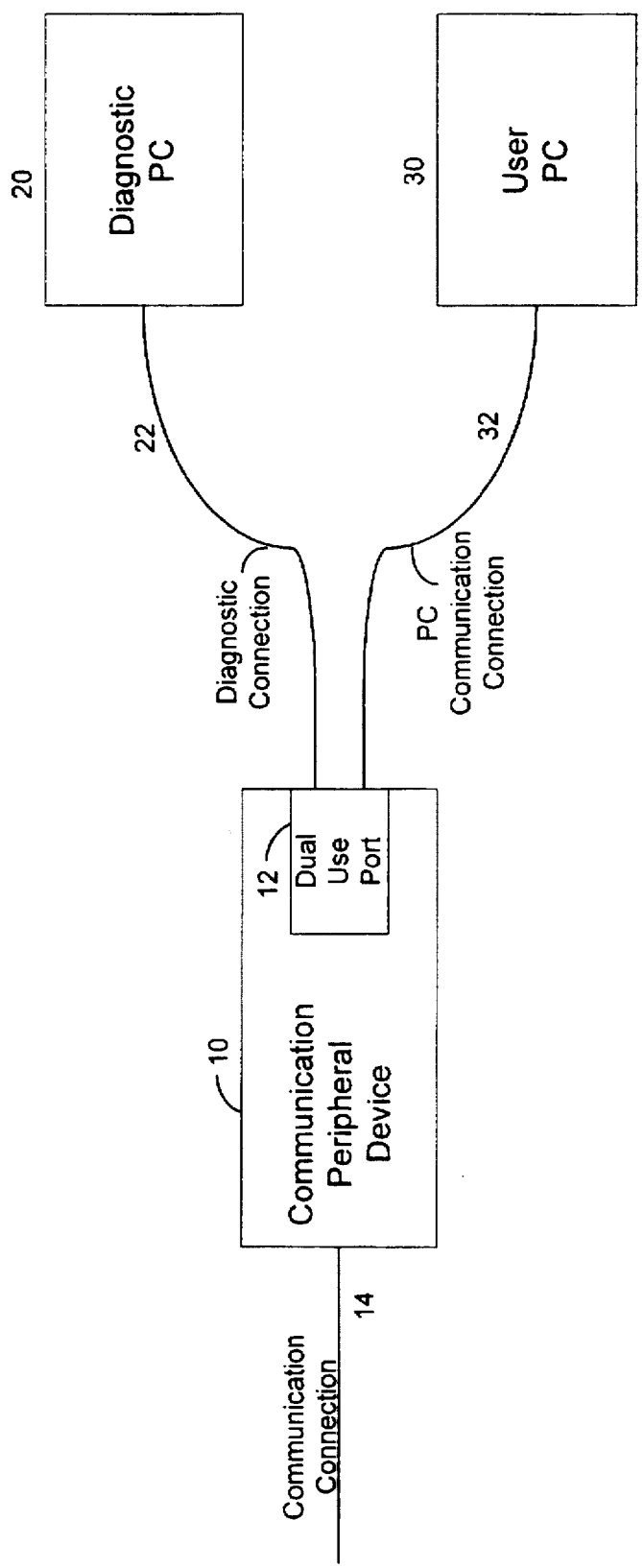
FIG. 1B is a block diagram of a system with a communication peripheral device including a dual use port.

FIG. 1B is a block diagram of a system that a communication peripheral including a dual use port. Elements in FIG. 1B are similar to elements in FIG. 1A. In FIG. 1B, both diagnostic connection 22 and PC communication connection 32 are connected to dual use port 12. In the configuration shown in FIG. 1B dual use port 12 may be different than the configuration shown in FIG. 1A. Alternatively, diagnostic connection 22 or PC communication connection 32 may be interconnected before at least one of those connections is connected to dual use port 12.

Figure 2:
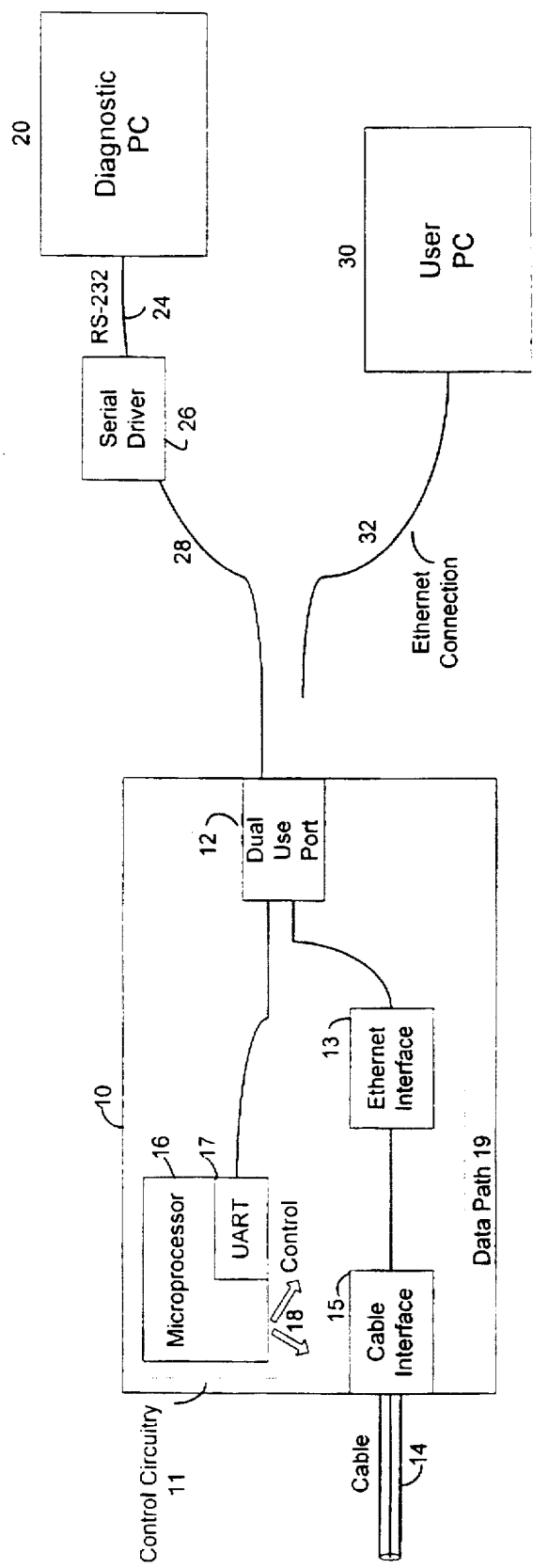
FIG. 2 is a block diagram of a system including a serial driver and a cable modem communication peripheral device with a dual use port, microprocessor, cable interface, and Ethernet interface.

FIG. 2 is a block diagram of a system including a serial driver and a cable modem communication peripheral device with a dual use port, microprocessor, cable interface, and internet interface. FIG. 2 includes communication peripheral device 10. Communication peripheral device 10 is a cable modem. FIG. 2 also includes diagnostic PC 20, RS-232 connection 24, serial driver 26, connection 28, PC communication connection 32, which is an ethernet connection, and a user PC 30.

Diagnostic PC 20 is coupled to serial driver 26 via RS-232 connection 24. Serial driver 26 is coupled to dual use port 12 on communication peripheral device 10 via connection 28. User PC 30 is coupled to PC communication connection 32. PC communication connection 32 may be coupled to communication peripheral device 10 via dual use port 12.

Communication peripheral device 10, which is a cable modem, includes dual use port 12, ethernet interface 13, cable interface 15, microprocessor 16, and control 18. Microprocessor 16 includes a UART 17. Dual use port 12 is coupled to UART 17 on microprocessor 16 and to ethernet interface 13. Ethernet interface 13 is coupled to cable interface 15. Cable interface 15 is coupled to a communication connection 14, which is a cable. Control 18 is control from microprocessor 16 and controls cable interface 15 and ethernet interface 13 and other circuitry on communication peripheral device 10.

PC communication connection 32 allows user PC 30 to communicate with communication peripheral device 10 via an ethernet protocol. The ethernet protocol is a carrier sense multiple to access with collision detect (CSMA/CD) protocol. In particular, the protocol used over PC communication connection 32 is a 10 BASE-T protocol. Alternatively, the connection could be other types of ethernet connections including but not limited to a 10 megabyte protocol. The protocol could also be any other standard protocol or interface. Examples of such interfaces could be other high speed ethernets or other interfaces. For more information about an ethernet interface using 10 BASE-T protocol and connection to a port, please refer to U.S. Pat. No. 5,249,183, issued to Wong et. al, date of patent: Sep. 28, 1993, which is incorporated herein by reference in its entirety. Dual use port 12 is compliant with the protocol used by user PC 30 to communicate communication peripheral device 10. Additionally, dual use port 12 allows for out of band communication.

Cable interface 15, which is coupled to ethernet interface 13, interfaces to communication connection 14. Cable interface 15 provides a connection to a cable system, thus allowing user PC 30 to communicate through a cable system. With such circuitry, communication peripheral device 10 provides a data path, allowing data communication from user PC 30 through to communication connection 14. Cable interface 15, or alternatively other circuitry on communication peripheral device 10, includes a tuner and other circuitry necessary to receive data from a cable network provider. Such a network provider may be a cable television provider or other provider using cable television infrastructure as a medium over which to transmit and receive data. Alternatively, cable interface 15 may be an interface to other communications media, for example, but not limited to, fiber optics, telephone connection, radio frequency communication, or infra red.

Microprocessor 16 controls communication peripheral device 10. Microprocessor 16 controls the data path 19 via control 18. Microprocessor 16 may have access the status of the modem, status of the data path 19, or other information of interest. For example, microprocessor 16 may have statistics regarding use or activity of communication peripheral device 10. Dual use port 12 via connection to UART 17 provides access to microprocessor 16. Such status information or other information is thus accessible through dual use port 12. Other information that may be present in microprocessor 16 or accessible through microprocessor 16 that would thus be available through dual use port 12 could include steps that the microprocessor has gone through, the state of the microprocessor, whether the microprocessor is synchronized, whether the data path or data communication is synchronized. Further, through access via out of band communication over dual use port 12, control commands may be given to communication peripheral device 10. These control commands may be received and acted upon by microprocessor 16. As an alternative microprocessor 16, other control circuitry which is capable of controlling communication peripheral device 10 may be used. The microprocessor and other circuitry for controlling communication peripheral device 10 is labeled control circuitry 11.

UART 17 is for serial communication. 9600 baud communication is used by UART 17. Also, communication via UART 17 could alternatively be communication other than serial communication which provides out of band information over dual use port 12. Any data stream communication may be provided over dual use port 12, in addition to the normal data path 19.

Diagnostic PC 20 performs diagnostics, trouble shooting, control, or other access to communication peripheral device 10 via dual use port 12. Serial driver 26 allows diagnostic PC 20 to be connected to an RS-232 connection and drive pins on dual use port 12 as necessary. In addition to diagnostic uses, diagnostic PC 20 could also used for a setup and configuration of communication peripheral device 10. The functionality of serial driver 26 could be imbedded in diagnostic PC 20 or within connection 28. Connection 28, serial driver 26, and RS-232 connection 24 may all together comprise a single connection corresponding to diagnostic connection 22 of FIG. 1A.

Dual use port 12 allows for a connection compliant with a standard ethernet protocol that may be easily accessible to user PC 30. Additionally, dual use port 12 provides access to communication peripheral device 10 for other purposes thus eliminating a need for a separate port with the additional expense, complexity, or space that could be required by an additional port. Dual use port 12 reduces user confusion by eliminating the need for an additional port, this purpose may not be clear to a user.

Figure 3:
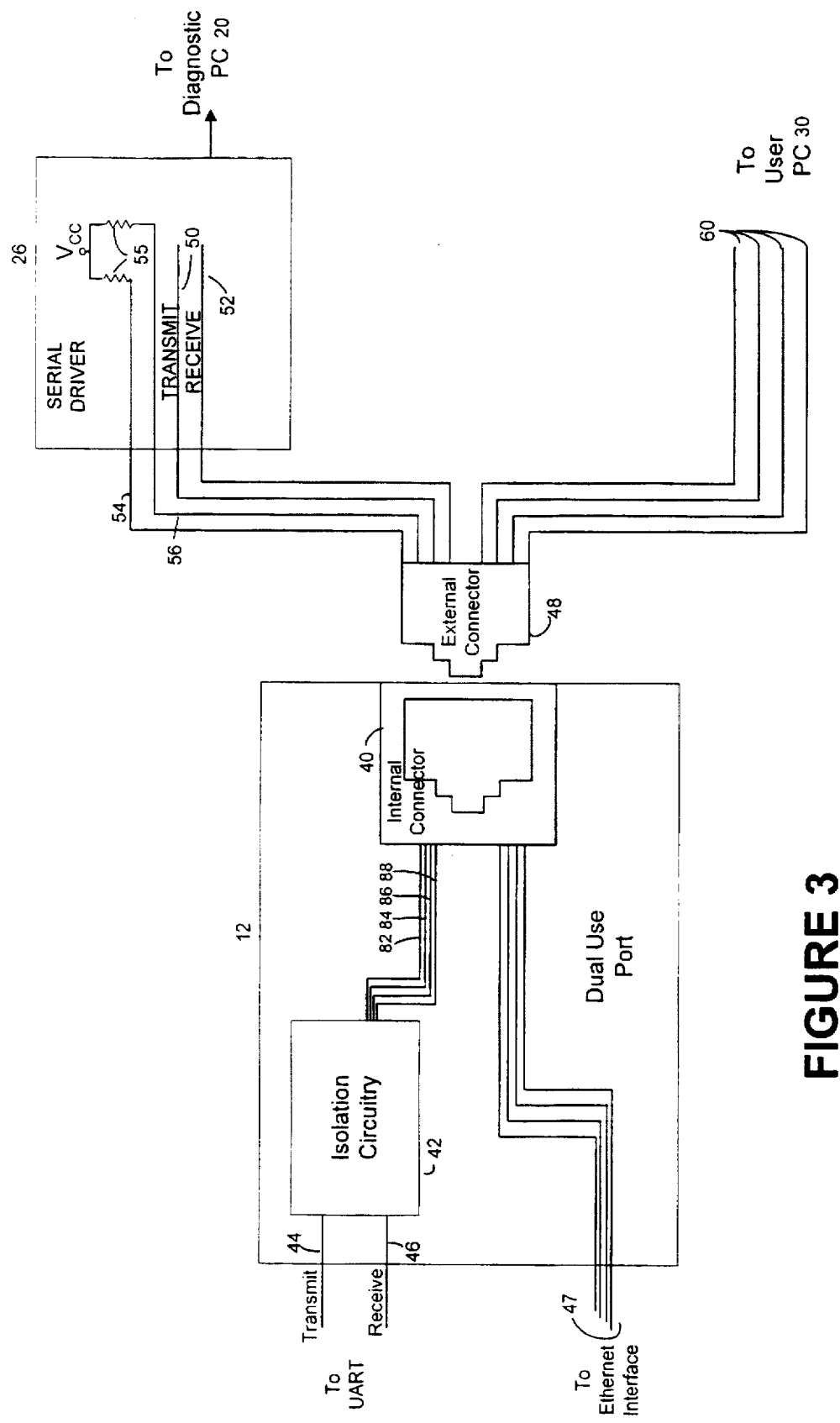
FIG. 3 is a block diagram showing a serial driver, and an external connector, and dual use port with an internal connector.

FIG. 3 is a block diagram showing a serial driver 26, an external connector 48, and dual use port 12 including an internal connector 40. FIG. 3 also includes transmit line 44, receive line 46, lines 47, lines 60, line 54, and line 56. Dual use port 12 includes internal connector 40, isolation circuitry 42, transmit line 44, receive line 46, and lines 47. Serial driver 26 includes VCC connection and resistors 55. Internal connector 40 is an RJ-45 connector. External connector 48 is also an RJ-45 connector that is compatible with internal connector 40. For additional discussion of RJ-45 jacks as used for the 10 BASE-T standard please see U.S. Pat. No. 5,613,873, issued to Bell, date of patent: Mar. 25, 1997, which is incorporated herein by reference in its entirety. Internal connector 40 is coupled to ethernet interface 13 via lines 47. Lines 47 are connected to a total of 4 pins on ethernet connector 40. Four pins remain unused by the ethernet 10 BASE-T standard. These extra pins are used for the out-of-band communication. Thus, internal connector 40 is coupled to isolation circuitry 42 for out-of-band communication. Isolation circuity 42 is coupled to transmit line 44 and to receive line 46. Transmit line 44 and receive line 46 are coupled to UART 17 so as to provide serial communication from UART through isolation circuitry 42 to internal connector 40. External connector 48 is coupled to lines 60 which correspond to PC communication connection 32 and provide in band communications such as for data in ethernet protocol to user PC 30. External connector 48 is coupled to serial driver 26. External connector 48 is coupled to transmit line 50 and receive line 52, which are coupled to diagnostic PC 20 to provide out of band communication with communication peripheral device 10. Lines 54 and 56 are coupled to external connector 48 and are coupled to resistors 55 and Vcc within serial driver 26. Lines 54 and 56 drive the isolation circuitry as necessary for communication via lines 50 and receive line 52.

Isolation circuitry 42 provides isolation of pins not normally used on internal connector 40 from the remainder of peripheral device 10. This isolation is an electrical isolation as required by a standard used on communication peripheral device 10. Other elements of the communication peripheral device also are constructed so as to maintain isolation as required by the standard. For example, elements on communication peripheral device are not constructed so close to each other on the respective circuit board or circuit boards so as to allow for cross talk or shorting between elements.

Figure 4:
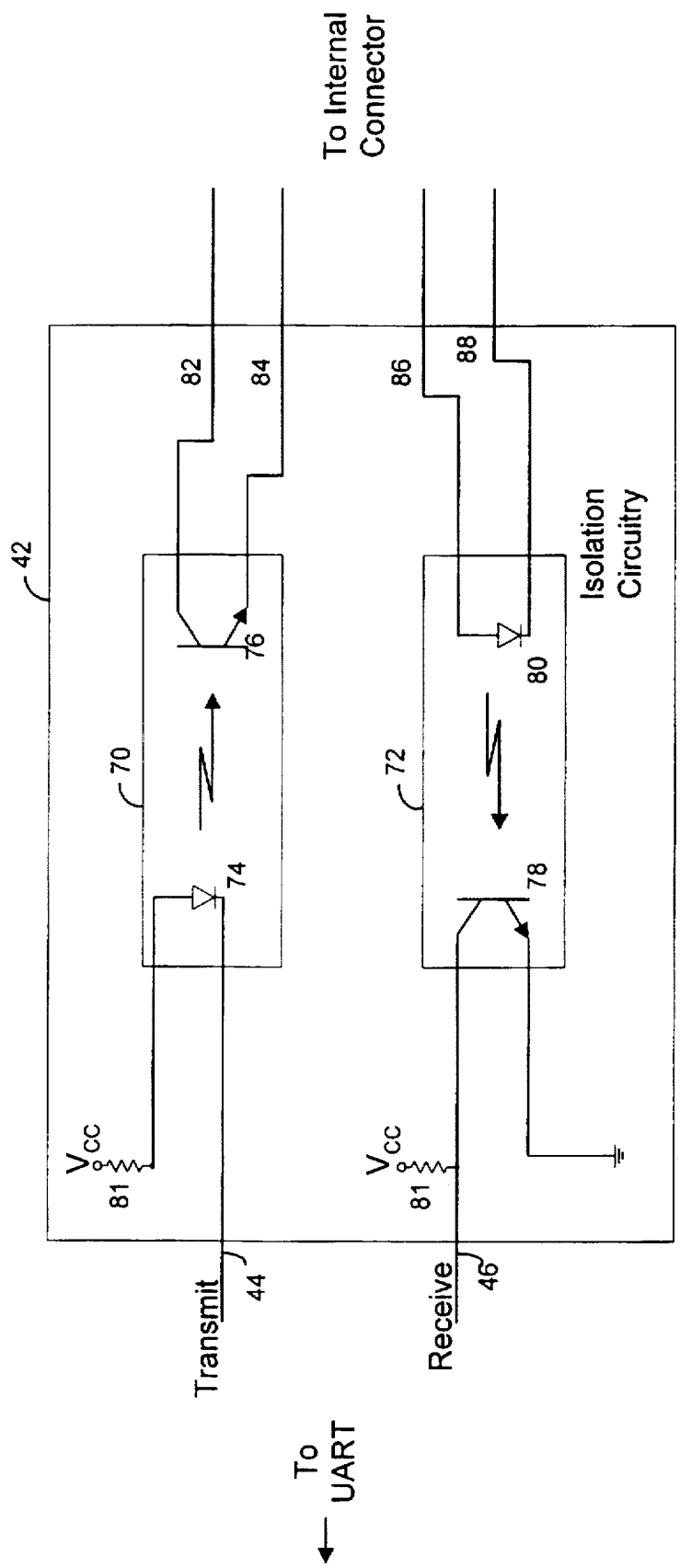
FIG. 4 is a block diagram showing isolation circuitry for a serial driver.

FIG. 4 is a block diagram showing isolation circuitry. FIG. 4 includes opto-isolator 70 and optoisolator 72. Also, FIG. 4 includes line 82, line 84, line 86, line 88, resistors 81, and Vcc connections. Optoisolator 70 includes photo diode 74 and photo receptor 76. Optoisolator 72 includes photodiode 80 and photo receptor 78. Transmit line 44 as coupled to optoisolator 70 through photo diode 74. Photodiode 74 is coupled to one of resistors 81 and Vcc. Thus, transmit line 44 provides an optical signal to photo detector 76 for communication and is electrically isolated. Similarly, receive line 46 is coupled to one of resistors 81 and Vcc and is connected to photo receptor 78 and thus receives signals that are electrically isolated and are produced by photodiode 80 from internal connector 40 via lines 86 and 88.

In one embodiment, isolation circuitry 42 is compliant with international standard ISO/IEC 8802-03 ANSI/IEEE standard 802.3, in particular, part 3; carrier sense multiple access with collision detection (CSMA/CD) access method and physical layer specifications. Isolation circuitry 42 meets MAU-TO-MDI interface characteristics isolation requirement. In particular, the MAU shall provide isolating between the DTE Physical Layer circuits including frame ground and all MDI leads including those not used by 10 BASE-T. This electrical separation shall withstand at least one of the following electrical strength tests:

(a) 1500 v rms at 50 Hz to 60 Hz for 60s, applied as specified in Section 5.3.2 of IEC 950: 1991, (b) 2250 Vdc for 60s, applied as specified in Section 5.3.2 of IEC 950: 1991, (c) a sequence of ten 2400 V impulses of alternating polarity, applied at intervals of not less than 1 s. The shape of the impulses shall be 1.2/50 μs (1.2 μs virtual front time, 50 μs virtual time of half value), as defined in IEC 60.

According to the 802.3 standard, there shall be no insulation breakdown, as defined in Section 5.3.2, of IEC 950: 1991, during the test. The resistance after the test shall be at least 2 MΩ measured at 500 Vdc.

Alternatively, for isolation, isolation circuitry 42 may comprise other forms of isolators such as capacitors such as high voltage capacitors or transformers. Further, other isolation parameters may apply in order for the port to be compliant with other standards.

Thus a communication peripheral device provided which as a port which is capable of dual use providing in band communication and out of ban communication.

We claim:

1. A peripheral device for use with a computer, the peripheral device comprising:

a data path;

a control circuit coupled to the data path for controlling data communication; and a port comprising:

a connector used by the data path, the connector including:

a first set of pins that are used by the data path, the first set of pins coupled to the data path for data communication from the data path to the computer the first set of pins used by a protocol for communication between the peripheral device and the computer; and a second set of pins that are not used by the data path and are not used by the protocol, the second set of pins coupled to the control circuit for providing access to the control circuit from the port.

2. The peripheral device of claim 1, wherein the connector comprises an RJ-45 connector.

3. The peripheral device of claim 1, comprising:

circuitry that provides serial communication between the second set of pins and the control circuit, the circuitry coupled to the second set of pins and the control circuit.

4. The peripheral device of claim 1, wherein the port comprises:

a set of isolators coupled to the second set of pins and the control circuitry, the set of isolators isolating the second set of pins.

5. The peripheral device of claim 4, wherein the set of isolators comprises opto-couplers.

6. The peripheral device of claim 1, wherein the protocol comprises a 10BASE-T Ethernet protocol.

7. The peripheral device of claim 6, wherein the port comprises a set of isolators coupled to the second set of pins and the control circuitry, the isolators isolating the second set of pins, an isolator in the set of isolators compliant with a 10BASE-T isolation specification.

8. The peripheral device of claim 1, comprising: a modem interface.

9. The peripheral device of claim 8, wherein the connector comprises an RJ-45 connector.

10. The peripheral device of claim 9, comprising:

circuitry that provides serial communication between the second set of pins and the control circuit, the circuitry coupled to the second set of pins and the control circuit.

11. The peripheral device of claim 9, wherein the port comprises:

a set of isolators coupled to the second set of pins and the control circuitry, the set of isolators isolating the second set of pins.

12. The peripheral device of claim 11, wherein the set of isolators comprises opto-couplers.

13. The peripheral device of claim 9, wherein the protocol comprises a 10BASE-T Ethernet protocol.

14. The peripheral device of claim 13, wherein the port comprises a set of isolators coupled to the second set of pins and the control circuitry, the isolators isolating the second set of pins, an isolator in the set of isolators compliant with a 10BASE-T isolation specification.

* * * * *